(12) United States Patent
Saini et al.

(10) Patent No.: US 8,134,553 B2
(45) Date of Patent: Mar. 13, 2012

(54) RENDERING THREE-DIMENSIONAL OBJECTS ON A SERVER COMPUTER

(75) Inventors: Shailesh Saini, Seattle, WA (US);
Steven Paul Geffner, Bothell, WA (US);
Gary Allan Pritting, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 11/859,888

(22) Filed: Sep. 24, 2007

(65) Prior Publication Data

US 2009/0079729 A1 Mar. 26, 2009

(51) Int. Cl.
- G06T 15/00 (2011.01)
- G06T 1/00 (2006.01)
- G06F 15/00 (2006.01)
- G06F 13/14 (2006.01)

(52) U.S. Cl. ......... 345/419; 345/501; 345/520; 345/522
(58) Field of Classification Search .................. 345/419, 345/501, 520, 522
See application file for complete search history.

(56) References Cited

U.S. PATENT DOCUMENTS

| | | | | |
|---|---|---|---|---|
| 5,936,641 | A | * | 8/1999 | Jain et al. ................. 345/503 |
| 5,991,713 | A | * | 11/1999 | Unger et al. .................. 704/9 |
| 6,377,257 | B1 | | 4/2002 | Borrel et al. |
| 6,384,821 | B1 | | 5/2002 | Borrel et al. |
| 6,396,500 | B1 | | 5/2002 | Qureshi et al. |
| 6,626,958 | B1 | * | 9/2003 | McCauley et al. ............. 715/210 |
| 6,657,647 | B1 | * | 12/2003 | Bright ........................ 715/856 |
| 6,704,024 | B2 | | 3/2004 | Robotham et al. |
| 6,798,417 | B1 | * | 9/2004 | Taylor ........................ 345/502 |
| 7,050,079 | B1 | | 5/2006 | Estrada et al. |
| 7,170,526 | B1 | | 1/2007 | Johnson |
| 7,673,327 | B1 | * | 3/2010 | Polis et al. .................... 726/5 |
| 2002/0015042 | A1 | * | 2/2002 | Robotham et al. ............. 345/581 |
| 2002/0049767 | A1 | * | 4/2002 | Bennett .................... 707/104.1 |
| 2002/0091738 | A1 | * | 7/2002 | Rohrabaugh et al. ......... 707/517 |
| 2002/0093538 | A1 | * | 7/2002 | Carlin ........................ 345/778 |
| 2002/0184238 | A1 | | 12/2002 | Chylla |
| 2003/0014478 | A1 | * | 1/2003 | Noble ........................ 709/203 |
| 2003/0128234 | A1 | * | 7/2003 | Brown et al. ................. 345/744 |
| 2004/0123239 | A1 | * | 6/2004 | Roessler ...................... 715/513 |

(Continued)

OTHER PUBLICATIONS

International Search Report dated Feb. 24, 2009 in International Application No. PCT/US2008/074523.

Buscher, et al., "Collaborative Augmented Reality Environments: Integrating VR, Working Materials, and Distributed Work Spaces", Proceedings of the Third International Conference on Collaborative Virtual Environments, 2000, pp. 10.

(Continued)

*Primary Examiner* — Xiao M. Wu
*Assistant Examiner* — David T Welch
(74) *Attorney, Agent, or Firm* — Hope Baldauff Hartman, LLC (57) ABSTRACT

Technologies are described herein for rendering documents containing three-dimensional objects. A client computer receives a request to display a document. If a program utilized to create the document is not available to display the document, the client computer transmits a request to a server computer to render the document, including the rendering of any three-dimensional objects contained therein. In response to receiving the request, the server computer determines whether the document contains any three-dimensional objects. If the document contains three-dimensional objects, the server computer renders the three-dimensional objects. Once the three-dimensional objects have been rendered, the remaining portion of the document is also rendered. The rendered version of the document is then returned to the client computer in response to the original request to render the document. The rendered document is then displayed on the client computer by a standard viewer application.

12 Claims, 5 Drawing Sheets

U.S. PATENT DOCUMENTS

| | | | |
|---|---|---|---|
| 2005/0005028 A1* | 1/2005 | Huang | 709/247 |
| 2005/0036675 A1* | 2/2005 | Knighton et al. | 382/154 |
| 2005/0179691 A1 | 8/2005 | Johnson | |
| 2005/0289156 A1* | 12/2005 | Maryka et al. | 707/100 |
| 2006/0010246 A1 | 1/2006 | Schulz et al. | |
| 2006/0085529 A1 | 4/2006 | Ziegler et al. | |
| 2006/0119616 A1 | 6/2006 | Park | |
| 2006/0200535 A1 | 9/2006 | Moser | |
| 2006/0248166 A1* | 11/2006 | Milosevic et al. | 709/219 |
| 2007/0028166 A1 | 2/2007 | Hundhausen et al. | |
| 2007/0188488 A1* | 8/2007 | Choi | 345/419 |
| 2007/0233792 A1* | 10/2007 | Sylthe et al. | 709/206 |
| 2008/0201331 A1* | 8/2008 | Eriksen et al. | 707/10 |

OTHER PUBLICATIONS

Grabner, "WebCAME: A Light•Weight Modular Client/Server Multiresolution Rendering System", ACM, 2003, pp. 63-72.

Banerjee, et al., "Remote Execution for 3d Graphics on Mobile Devices", International Conference on Wireless Networks, Communications and Mobile Computing, vol. 2, Jun. 13-16, 2005, IEEE, 2005, pp. 1154-1159.

* cited by examiner

RENDERING THREE-DIMENSIONAL OBJECTS ON A SERVER COMPUTER

BACKGROUND

Desktop productivity software applications allow users to create word processing documents, spreadsheet documents, presentation documents, and other kinds of documents. These documents often include text, formatting, images, and other types of objects, including three-dimensional ("3-D") objects. For instance, such documents may include three-dimensional objects like three-dimensional text, three-dimensional tables, three-dimensional shapes, three-dimensional graphics, and three-dimensional charts. It is common for users to add such three-dimensional objects to a word processing or spreadsheet document to add visual flair to the document.

In addition to the creation of documents, typical desktop productivity applications also allow users to view and edit documents created by other users using the same application or a compatible application. However, in order to view a document created by another user, the appropriate software application utilized to create the document, or a compatible application program, must typically be installed on the computer on which the document is to be viewed. For instance, if a user receives a word processing document from another user and desires to view the document, including all of the images, three-dimensional objects, and other content contained therein, it is typically necessary for a copy of the word processing application program utilized to create the document to be installed on the user's computer.

In many cases, a user may simply be unable to view a document if they do not have a copy of the application program utilized to create the document installed on their computer. In other cases, it may be necessary for a user to locate, download, and install a compatible viewer application program for displaying the document on their computer in order to view the document. It may, however, be difficult for a user to locate, install, and execute such a viewer application. In yet other cases, a compatible version of the application program or viewer application may not be available for the type of device on which the user wishes to view the document. For instance, a user may wish to view a document on a personal digital assistant ("PDA") or a wireless mobile telephone for which a version of the application program utilized to create the document or a viewer application does not exist. This can be extremely frustrating for a user that has a need to view a document, and all of the images, three-dimensional objects, and other content contained therein, but who does not possess the necessary application program utilized to create the document.

It is with respect to these considerations and others that the disclosure made herein is presented.

SUMMARY

Technologies are described herein for rendering documents containing three-dimensional objects on a server computer. In particular, through the utilization of the technologies and concepts presented herein, a document containing one or more three-dimensional objects can be rendered on a server computer for display using a standard viewer application program executing on a client computer, such as a world wide web ("web") browser application. Because the document, including any three-dimensional objects contained therein, is rendered on the server computer, there is no need for the application program utilized to create the document or a specific viewer application for the document type to be installed on the client computer.

According to one aspect presented herein, a client computer receives a request to display a document, such as a word processing document, a presentation document, or a spreadsheet document. The request may come, for instance, in response to a user request to view the document. In response to such a request, the client computer determines whether an application program utilized to create the document is available to the client computer for displaying the document. If the application program utilized to create the document is not available to display the document, the client computer transmits a request to a server computer to render the document, including the rendering of any three-dimensional objects contained in the document.

In response to receiving a request to render a document, the server computer parses the document to determine if the document contains any three-dimensional objects. For instance, the server computer may parse the document to determine if any three-dimensional tables, charts, graphics, shapes, or text are contained in the document. If the document does contain three-dimensional objects, the server computer renders the three-dimensional objects. Through the rendering process, the three-dimensional objects are transformed into two-dimensional images. In one embodiment, the images are rendered in a web-standard image format, such as the portable network graphics ("PNG") format. According to embodiments, the same or a different server computer may perform the rendering of the three-dimensional objects. In this manner, the rendering process can be scaled to multiple server computers.

Once the three-dimensional objects have been rendered, the remaining portion of the document is also rendered to a web-standard image format, including compositing into the document any rendered three-dimensional objects. The rendered version of the document is then returned to the client computer in response to the original request to render the document. Because the rendered document is in a web-standard image format, the rendered document can be displayed on the client computer by a standard viewer application commonly available on many types of devices, such as a web browser application program. The rendered version of the document, and any rendered three-dimensional objects contained therein, appears substantially similar when displayed by the standard viewer application as it would if displayed by the application program that created the document. According to embodiments, single pages of the document, including any three-dimensional objects contained therein, may be rendered at a time rather than an entire document.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for rendering three-dimensional objects on a server computer. Through the use of the technologies and concepts presented herein, a document containing one or more three-dimensional objects can be rendered on a server computer for display using a standard viewer application program executing on a client computer. This process eliminates the need for the application program utilized to create the document, or a specific viewer application for the document type, to be installed on the client computer in order to view the document.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for rendering three-dimensional objects on a server computer will be described.

Figure 1:
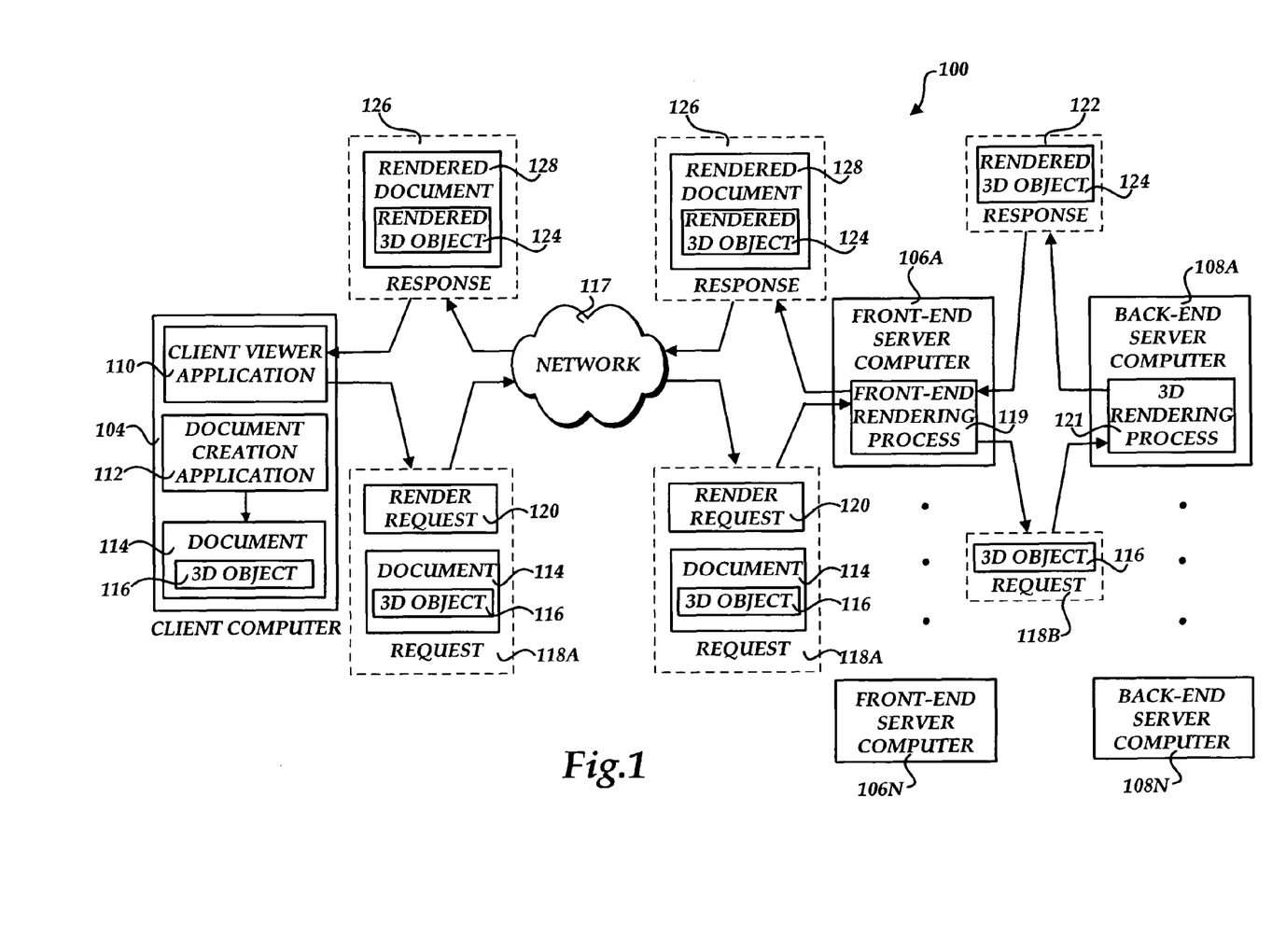
FIG. 1 is a network diagram showing aspects of an illustrative operating environment and several software components provided by the embodiments presented herein.

Turning now to FIG. 1, details will be provided regarding an illustrative operating environment and several software components provided by the embodiments presented herein. In particular, FIG. 1 shows aspects of a system 100 for rendering three-dimensional objects on a server computer. The system 100 includes a client computer 104, one or more front-end server computers 106A-106N, and one or more back-end server computers 108A-108N. As illustrated in FIG. 1, the client computer 104, the front-end server computer 106A, and the back-end server computer 108A are interconnected through one or more local and wide area networks, such as the network 117. It should be appreciated that many more network connections may be utilized than illustrated in FIG. 1.

The client computer 104 illustrated in FIG. 1 comprises a standard desktop or laptop computer system capable of executing an operating system and one or more application programs. In particular, according to embodiments, the client computer 104 is operative to execute a document creation application 112. The document creation application 112 comprises an application program for creating a document 114, that may or may not include one or more three-dimensional objects such as the 3-D object 116.

According to implementations, the document creation application 112 comprises an application program for creating a word processing document, a presentation document, or a spreadsheet document. It should be appreciated, however, that the implementations described herein may be utilized with document creation applications for creating any type of document with 3-D objects contained therein. According to other aspects, the 3-D object 116 comprises a three-dimensional table, a three-dimensional chart, a three-dimensional graphic, a three-dimensional shape, or a three-dimensional text object. It should be appreciated, however, that the 3-D object 116 may comprise any type of object having three-dimensional properties.

As illustrated in FIG. 1, the client computer 104 is also operative to execute a client viewer application 112. According to one implementation, the client viewer application 110 comprises an application configured to display images formatted according to a standard image format. For instance, in one implementation, the client viewer application 110 comprises an application program capable of displaying a PNG image file. The client viewer application 112 may also be configured to display other types of web-standard image formats. In one particular implementation, the client viewer application 110 comprises a web browser application program capable of displaying images formatted in web-standard image formats. It should be appreciated, however, that the functionality described herein as being performed by the client viewer application 110 may be integrated into other types of programs capable of displaying web-standard image formats.

As will be discussed in greater detail below, the client computer 104 is operative to receive a request to display a document, such as the document 114. In response to receiving such a request, the client computer 104 determines whether the document creation application 112 is available to render and display the document 114. If the document creation application 112 is unavailable to display the document 114, the client computer 104 utilizes functionality provided by the front-end server computer 106A and the back-end server computer 108A to render the document 114. The document creation application 112 may be unavailable, for instance, if the document creation application 112 has not been installed on the client computer 104 or has been installed but is non-functional.

When the client computer 104 receives a request to display a document 114 for which a document creation application 112 is unavailable, the client computer 104 transmits a request 118A to the front-end server computer 106A. In the embodiment shown in FIG. 1, the request 118A includes a render request 120 and the document 114. In other embodiments, however, the request 118A includes the render request 120 and a reference to the document 114. In this embodiment, the document 114 is not transmitted with the request 118A. Rather, the client computer 104 stores the document 114 on a networked storage location that is accessible by the front-end server computer 106A and the back-end server computer 108A. In this manner, the document 114 need not be transmitted with the request 118A.

If the document 114 contains any 3-D objects, such as the 3-D object 116, these objects are also transmitted with the request 118A. The request 118A may also include information regarding the capabilities of the client computer 104 and the client viewer application 110 for use by the front-end server computer 106A and the back-end server computer 108A in rendering the document 114. For instance, the client computer 104 may transmit information regarding the resolution of a display device connected thereto. This information is utilized by the front-end server computer 106A and the back-end server computer 108A to determine the resolution at which the document 114 should be rendered.

When the front-end server computer 106A receives the request 118A, the front-end server computer 106A determines whether the document 114 contains any three-dimensional objects. If three-dimensional objects are contained in the document 114, the front-end server computer 106A transmits a request 118B to the back-end server computer 108A to render the three-dimensional object. The request 118B includes the three-dimensional object 116 to be rendered. The back-end server computer 108A receives the request 118B and initiates the 3-D rendering process 121.

The 3-D rendering process 121 takes the 3-D object 116 and renders the 3-D object 116 into an image. According to embodiments, a standard image format such as PNG may be utilized to render the 3-D object 116. Other types of image formats may also be utilized. When the 3-D rendering process 121 has completed rendering the 3-D object 116, a response 122 is returned to the front-end server computer 106A. The response 122 includes the rendered 3-D object 124.

When the front-end server computer 106A receives the response 122, a front-end rendering process 119 is utilized to render the other portions of the document 114. This may include, for instance, rendering other content in the document 114 and compositing the rendered 3-D object 124 into the rendered document 128. Like the 3-D rendering process 121, the front-end rendering process 119 renders the document 114 into a web-standard image format, such as PNG. In this manner, the output from the front-end rendering process 119 can be displayed by any standard viewer application capable of rendering web-standard image formats.

Once the front-end rendering process 119 has completed, the front-end server computer 106A transmits a response 126 to the client viewer application 110. The response 126 includes the rendered document 128 and any rendered 3-D objects 124. Once the response 126 has been received by the client viewer application 110, the client viewer application 110 displays the rendered document 128 on a display device of the client computer 104.

It should be appreciated that while the process described above with reference to FIG. 1 causes an entire document 114 to be rendered by the server computers 106A and 108A, other implementations may cause sub-portions of the document 114 to be rendered at a time. For instance, according to one implementation, individual pages of the document 114, including any 3-D objects contained therein, may be rendered by the server computers 106A and 108A and returned to the client viewer application 110. Rendering pages of the document 114 one at a time reduces the computational requirements of the front-end server computer 106A and the back-end server computer 108A.

It should also be appreciated that while the process described with respect to FIG. 1 is described in conjunction with a single front-end server computer 106A and a single back-end server computer 108A, multiple computing systems may be utilized. For instance, multiple front-end server computers 106A-106N may be utilized to field requests 118A from the client computer 104. Similarly, multiple back-end server computers 108A-108N may be utilized to render 3-D objects in parallel. According to other implementations, scalability may be obtained by utilizing multiple processing units on each of the back-end server computers 108A-108N, such as multiple central processing units or multiple core central processing units. In this manner, the rendering of many 3-D objects can be performed in parallel. In other implementations, the processing presented herein as occurring on multiple computing systems may be performed on a single computing system.

It should also be appreciated that the rendered document 118, including any rendered 3-D objects 124 contained therein, are rendered by the front-end server computer 106A and the back-end server computer 108A with full visual fidelity. Full visual fidelity refers to the ability of the front-end server computer 106A and the back-end server computer 108A to render the document 114, and any three-dimensional objects 116 contained therein, with no loss of visual quality. In this manner, the rendered document 128, and any rendered 3-D objects 124 contained therein, will appear to a user of the client computer 104 in a substantially similar manner as if the document 114 was displayed by the document creation application 112. Additional details regarding the various computing systems and software components illustrated in FIG. 1 will be provided below with respect to FIG. 2-5.

Figure 2:
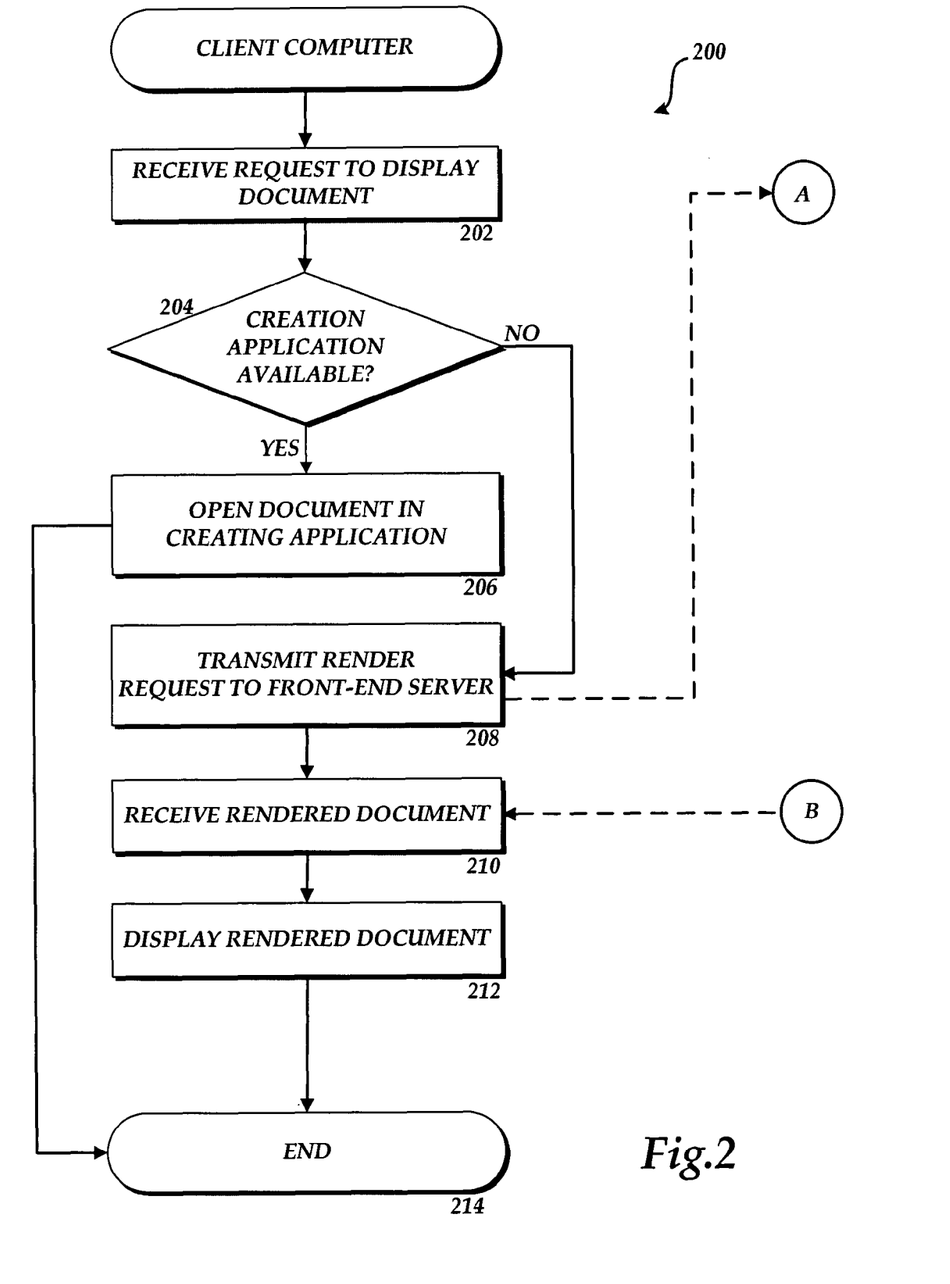
FIGS. 2-4 are flow diagrams illustrating aspects of the operation of a client computer, a front-end server computer, and a back-end server computer, respectively, provided in one embodiment presented herein.
Figure 3:
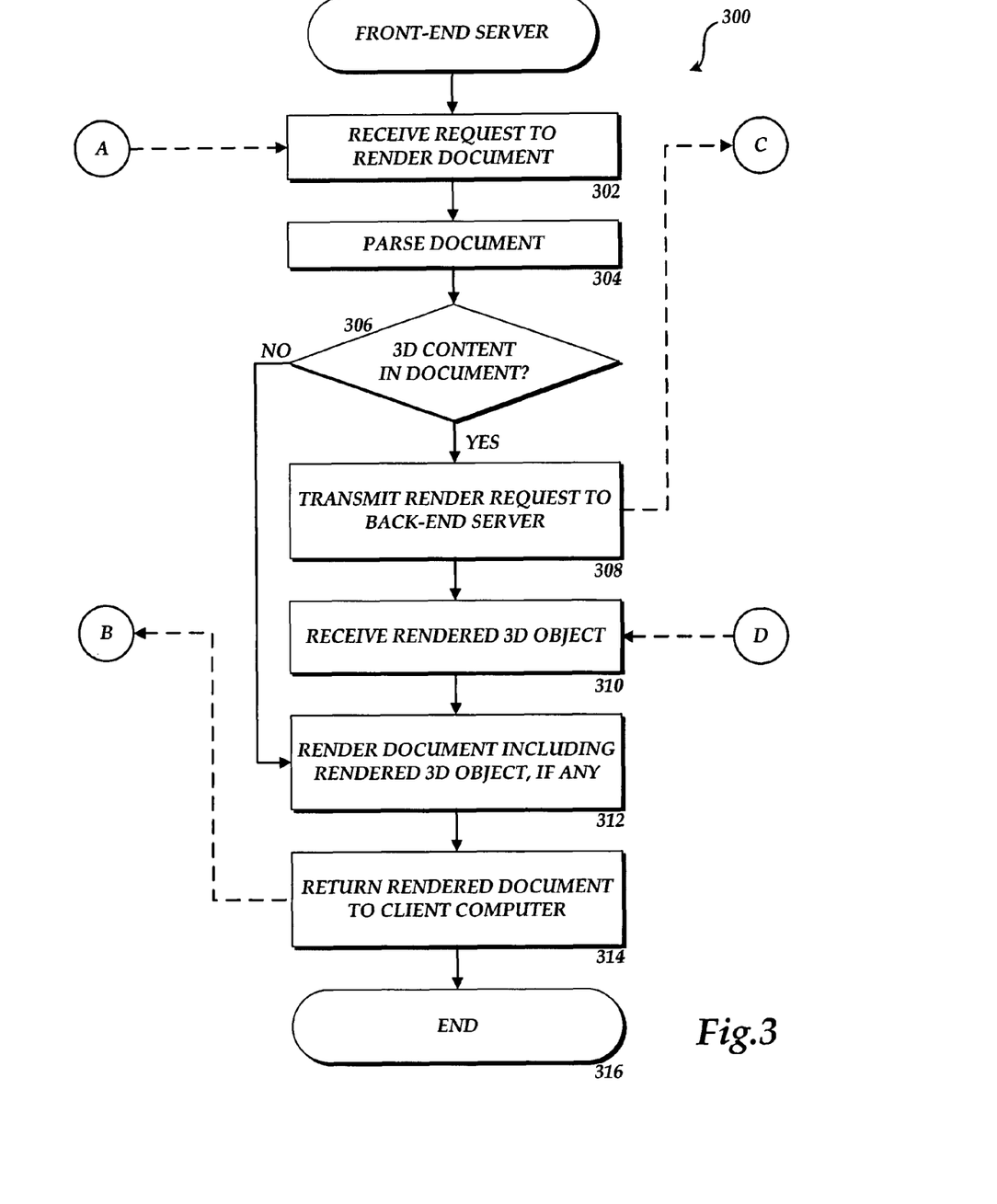
Figure 4:
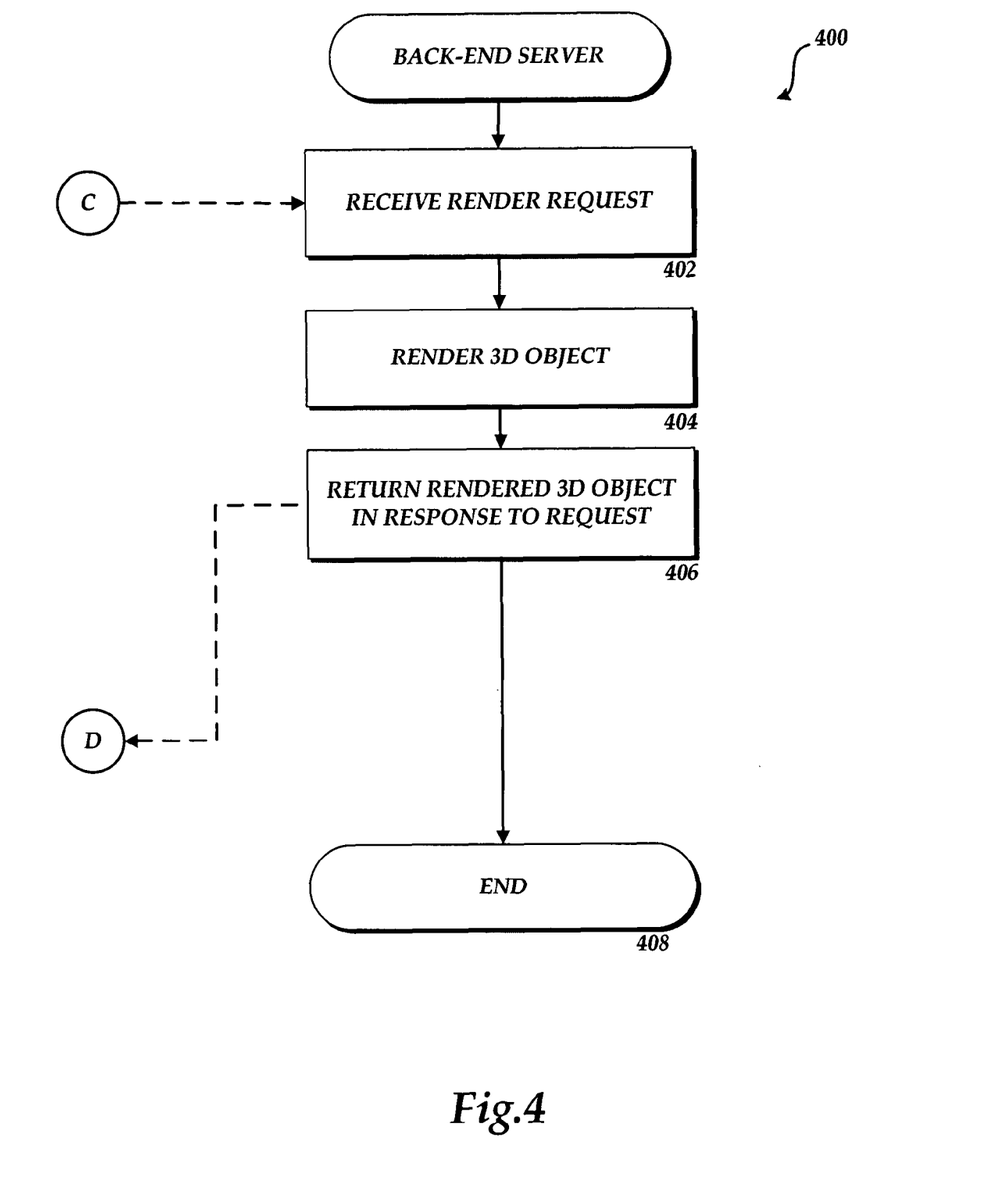

Referring now to FIGS. 2-4, additional details will be provided regarding the embodiments presented herein for rendering three-dimensional objects on a server computer. In particular, FIGS. 2-4 are flow diagrams illustrating aspects of the operation of the client computer 104, the front-end server computer 106A, and the back-end server computer 108A, respectively, in one embodiment presented herein. The FIGS. 2-4 are described together to illustrate the interaction between the client computer 104, the front-end server computer 106A, and the back-end server computer 108A.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the client computer 104 receives a request to display a document 114. Such a request may come, for instance, in response to a user request to view the contents of the document 114. From operation 202, the routine 200 continues to operation 204, where the client computer 104 determines whether the document creation application 112 is available to display the document 114. If the document creation application 112 is available, the routine 200 continues to operation 206, where the client computer 104 causes the document creation application 112 to open the document 114 and display the document. From operation 206, the routine 200 continues to operation 214, where it ends.

If the document creation application 112 is unavailable, the routine 200 branches from operation 204 to operation 208. At operation 208, the client computer 104 transmits the request 118 to the front-end server computer 106A. As described above, the request 118 comprises a request to the front-end server computer 106 to render the document 114 and includes the document 114 and any three-dimensional objects 116 contained therein.

The front-end server computer 106A receives the request 118A at operation 302 of the routine 300. In response to receiving such a request, the front-end server computer 106A parses the document 114 at operation 304. Once the parsing has been completed, the routine 300 continues to operation 306, where the front-end server computer 106A determines whether any three-dimensional content is contained in the document 114. If no three-dimensional content is contained in the document 114, the routine 300 branches from operation 306 to operation 312, described below. If, however, the document 114 contains one or more 3-D objects 116, the routine 300 continues from operation 306 to operation 308. At operation 308, the front-end server computer 106A transmits the request 118B to the back-end server computer 108A. As discussed above, the request 118B comprises a request to the back-end server computer 108A to render the 3-D object 116.

The back-end server 108A receives the request 118B at operation 402 of the routine 400. The routine 400 then continues to operation 404, where the 3-D rendering process 121 is executed to render the 3-D object 116 into the rendered 3-D object 124. Once the 3-D rendering process 121 has completed, a response 121, including the rendered 3-D object 124, is returned to the front-end server computer 106A at operation 406. From operation 406, the routine 400 continues to operation 408, where it ends.

The front-end server computer 106A receives the rendered 3-D object 124 at operation 310 of the routine 300. From operation 310, the routine 300 continues to operation 312, where the document 114 is rendered by the front-end rendering process 119, including compositing of the rendered 3-D object 124 into the rendered document 128. Once the front-end rendering process has completely rendered the document 128, the routine 300 continues to operation 314, where the response 126 is returned to the client computer 104, including the rendered document 128 and the rendered 3-D object 124. From operation 314, the routine 300 proceeds to operation 316, where it ends.

The client computer 104 receives the response 126 at operation 210 of the routine 200. In response to receiving response 126 including the rendered document 128, the routine 200 continues to operation 212, where the client viewer application 110 displays the rendered document 128 including any rendered 3-D objects 124 contained therein. From operation 212, the routine 200 continues to operation 214, where it ends.

It should be appreciated that although the routines 200, 300, and 400, illustrate the process of rendering an entire document 114, a similar process may be utilized to render single pages of a document 114 at a time. It should also be appreciated that although the rendering of the document 114 is described as being performed by both a front-end server computer 106A and a back-end server computer 108A, these processes may be performed by a single server computer. In particular, the front-end rendering process 119 and the 3-D rendering process 121 may be executed on a single server computer. Other types of implementations may also be utilized to maximize the network performance and processor utilization of the various computers described herein.

Figure 5:
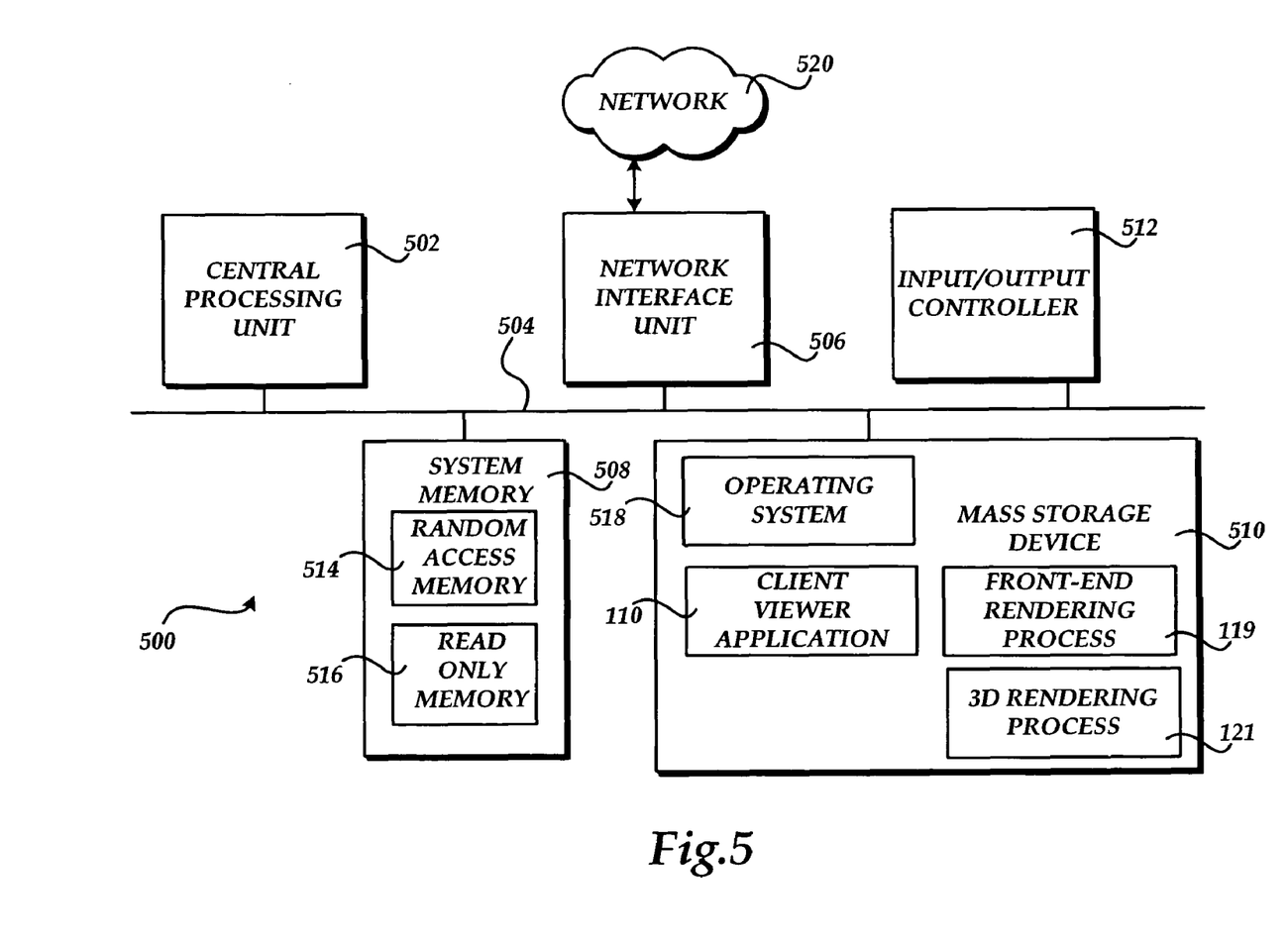
FIG. 5 is a computer architecture diagram showing an illustrative computer hardware and software architecture for a computing system capable of implementing aspects of the embodiments presented herein.

FIG. 5 shows an illustrative computer architecture for a computer 500 capable of executing the software components described herein for rendering a three-dimensional object on a server computer in the manner presented above. The computer architecture shown in FIG. 5 illustrates a conventional desktop, laptop, or server computer and may be utilized to execute any aspects of the software components presented herein described as executing on the client computer 104, the front-end server computers 106A-106N, or the back-end server computers 108A-108N.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the client viewer application 110, the front-end rendering process 119, and the 3-D rendering process 121, each of which was described in detail above with respect to FIGS. 1-4. The mass storage device 510 and the RAM 514 may also store other types of program modules.

Based on the foregoing, it should be appreciated that technologies for rendering three-dimensional objects on a server computer are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for rendering a three-dimensional object on a server computer, the method comprising:
   receiving a request from a client computer to render a document at a server computer;
   in response to receiving the request, parsing the document at the server computer to determine whether the document contains a three-dimensional object; and
   in response to determining that the document contains a three-dimensional object,
      extracting the three-dimensional object from the document by the server computer,
      rendering the three-dimensional object on another server computer,
      rendering a portion of the document excluding the three-dimensional object at the server computer,
      including the rendered three-dimensional object with the rendered portion of the document at the server computer to create a rendered document comprising a single image format, and
      providing the rendered document comprising the single image format to the client computer in response to the request to render the document.

2. The method of claim 1, further comprising, in response to determining that the document does not contain a three-dimensional object:
   rendering the document at the server computer; and
   providing the rendered document comprising the single image format to the client computer in response to the request to render the document.

3. The method of claim 1,
   wherein the request to render a document comprises a request to render a single page of a document,
   wherein parsing the document to determine whether the document contains a three-dimensional object comprises parsing the single page of the document to determine whether the page contains a three-dimensional object,
   wherein rendering the document including the rendered three-dimensional object to create a rendered document comprises
      rendering the single page of the document excluding the three-dimensional object,
      including the rendered three-dimensional object with the rendered portion of the document to create a rendered page of the document, and
   wherein providing the rendered document in response to the request to render the document comprises providing the rendered page of the document to the client computer in response to the request to render the single page of the document.

4. The method of claim 1, wherein the rendered document is substantially similar to a rendering of the document generated by an application program utilized to create the document.

5. The method of claim 1, wherein the rendered document comprises an image and wherein the single image format is formatted according to a world wide web (web) standard image format.

6. A system for rendering a three-dimensional object on a server computer, the system comprising:
   a first server component operative to receive a request from a client computer to render a document, to parse the document to determine whether the document contains a three-dimensional object, and in response to determining that the document contains a three-dimensional object, extract the three-dimensional object from the document at the first server component, and transmit a request to a second server component to render the three-dimensional object; and
   the second server component operative to receive the request to render the three-dimensional object from the first server component, to render the three-dimensional object, and to return the rendered three-dimensional object to the first server component in response to the request received from the first server component to render the three-dimensional object, the first server component further operative to
   receive the rendered three-dimensional object from the second server component;
   render a portion of the document excluding the three-dimensional object;
   include the rendered three-dimensional object with the rendered portion of the document to create a rendered document comprising a single image format, and
   provide the rendered document comprising the single image format to the client computer in response to the request to render the document.

7. The system of claim 6, wherein in response to determining that the document does not contain a three-dimensional object the first server component is further operative to:
   render the document to create a rendered document; and to
   provide the rendered document to the client computer in response to the request to render the document.

8. The system of claim 7, wherein the first server component is executed on a first server computer and wherein the second server component is executed on a second server computer.

9. The system of claim 7, wherein the first server component and the second server component are executed on a single server computer.

10. The system of claim 7, wherein the rendered document is substantially similar to a rendering of the document generated by an application program utilized to create the document.

11. The system of claim 10, wherein the rendered document comprises an image and wherein the single image format is formatted according to a world wide web (web) standard image format.

12. A computer-readable hardware medium that is not a signal having computer-executable instructions stored thereupon which, when executed by a computer, cause the computer to:
   receive a request to render a document from a client computer;
   in response to receiving the request, to parse the document to determine whether the document contains a three-dimensional object;

in response to determining that the document contains a three-dimensional object, to extract the three-dimensional object from the document by the computer, to render the three-dimensional object to a single standard image format by another computer, to render a portion of the document excluding the three-dimensional object, to include including the rendered three-dimensional object with the rendered portion of the document to create a rendered document in the single standard image format that is substantially similar to a rendering of the document generated by an application program utilized to create the document;

in response to determining that the document does not contain a three-dimensional object, to render the document to create a rendered document in the single standard image format that is substantially similar to a rendering of the document generated by an application program utilized to create the document; and to provide the rendered document comprising the single standard image format to the client computer in response to the request to render the document.

* * * * *